(12) United States Patent
Huang et al.

(10) Patent No.: US 10,069,584 B2
(45) Date of Patent: Sep. 4, 2018

(54) FREQUENCY CALIBRATION APPARATUS AND METHOD

(71) Applicant: Institute For Information Industry, Taipei (TW)

(72) Inventors: Ding-Jie Huang, Taipei (TW); Yi-Chih Tung, Taipei (TW); Chih-Hsiang Ho, Taipei (TW); Muh Wu, Taipei (TW); Shu-Min Chuang, Taipei (TW)

(73) Assignee: Institute For Information Industry, Taipei (TW)

( * ) Notice: Subject to any disclaimer, the term of this patent is extended or adjusted under 35 U.S.C. 154(b) by 143 days.

(21) Appl. No.: 15/082,553

(22) Filed: Mar. 28, 2016

(65) Prior Publication Data

US 2017/0222744 A1 Aug. 3, 2017

(30) Foreign Application Priority Data

Feb. 1, 2016 (TW) .............................. 105103111 A

(51) Int. Cl.
*H04J 3/06* (2006.01)
*H04L 12/26* (2006.01)

(52) U.S. Cl.
CPC ........ *H04J 3/0667* (2013.01); *H04L 43/0864* (2013.01)

(58) Field of Classification Search
CPC .......................... H04J 3/0667; H04L 43/0864
See application file for complete search history.

(56) References Cited

U.S. PATENT DOCUMENTS

| | | | |
|---|---|---|---|
| 2006/0007960 A1* | 1/2006 | Liu | ..................... H04N 21/8547 370/503 |
| 2013/0080817 A1* | 3/2013 | Mihelic | ..................... G06F 1/12 713/401 |
| 2014/0064303 A1* | 3/2014 | Aweya | .................. H04J 3/0667 370/509 |

FOREIGN PATENT DOCUMENTS

WO 2014037684 A1 3/2014

* cited by examiner

*Primary Examiner* — Zhiren Qin
*Assistant Examiner* — Harry H Kim
(74) *Attorney, Agent, or Firm* — Skaar Ulbrich Macari, P.A.

(57) ABSTRACT

A frequency calibration apparatus and method are provided. An oscillator of the frequency calibration apparatus has an operation frequency. The frequency calibration apparatus receives a plurality of time packets from an NTP server at a plurality of first time points. Each of the time packets records a second time point that the NTP server transmits the time packet. The frequency calibration apparatus calculates an offset for each of the time packets in a subset of all the time packets, calculates a clock skew according to the first time points and the offsets of the time packets in the subset, calculates a difference between the clock skew and a standard frequency value, determines that an absolute value of the difference is greater than a threshold, and adjusts the operation frequency to an initial frequency after determining that the absolute value of the difference is greater than the threshold.

12 Claims, 5 Drawing Sheets

FREQUENCY CALIBRATION APPARATUS AND METHOD

PRIORITY

This application claims priority to Taiwan Patent Application No. 105103111 filed on Feb. 1, 2016, which is hereby incorporated by reference in its entirety.

FIELD

The present invention relates to a frequency calibration apparatus and a frequency calibration method. More particularly, the present invention relates to a frequency calibration apparatus and a frequency calibration method that uses the Network Time Protocol (NTP).

BACKGROUND

With the development of technologies, the operations of many equipment and apparatuses, such as small cells, require the use of an oscillator. However, after these equipment and apparatuses have been used for a period of time, the change of the external environment (e.g., the temperature and the humidity) or the aging of hardware tends to cause an offset of the operation frequency of the oscillator thereof. When the offset of the operation frequency of the oscillator becomes too large, the equipment and apparatuses may not be able to operate normally. For example, when the small cell is synchronous with other apparatuses, the clock precision that needs to be provided by its oscillator is 50~250 parts per billion (ppb). In this case, if the oscillator of the small cell cannot provide the clock precision ranging between 50 ppb and 250 ppb, some operations cannot be performed normally by the small cell, e.g., the handover operation.

Currently, some conventional technologies are available for synchronization between apparatuses. Most of the conventional technologies are for time synchronization, e.g., the Network Time Protocol (NTP), the Precision Time synchronization Protocol (PTP), and the Global Positioning System (GPS). The Synchronous Ethernet (SyncE) among conventional technologies is for frequency synchronization. Additional hardware needs to be provided when the frequency synchronization is achieved by adopting the PTP and the GPS for calculation or by directly using the SyncE. However, the hardware is very expensive, so it represents a great burden for users. Moreover, the use of the GPS is impossible in indoor environments.

Accordingly, it is important to find a technique to calibrate the offset of the operation frequency at a low cost.

SUMMARY

The disclosure includes a frequency calibration apparatus which comprises an oscillator, a transceiver, and a processor. The processor is electrically connected to the oscillator and the transceiver. The oscillator has an operation frequency. The transceiver receives a plurality of time packets from a Network Time Protocol (NTP) server at a plurality of first time points. Each of the time packets records a second time point that the NTP server transmits the time packet. The processor executes the following operation for a subset of the time packets: subtracting the first time point from the second time point to obtain an offset for each of the time packets included in the subset. The processor further calculates a clock skew according to the first time points and the offsets of the time packets included in the subset. The processor further calculates a difference between the clock skew and a standard frequency value. The processor further determines that an absolute value of the difference is greater than a threshold and adjusts the operation frequency to an initial frequency after determining that the absolute value of the difference is greater than the threshold.

The disclosure also includes a frequency calibration method for an electronic apparatus. The electronic apparatus comprises an oscillator, which has an operation frequency. The frequency calibration method comprises the following steps: (a) receiving a plurality of time packets from an NTP server at a plurality of first time points, wherein each of the time packets records a second time point that the NTP server transmits the time packet, (b) executing the following operation for a subset of the time packets: subtracting the first time point from the second time point to obtain an offset for each of the time packets included in the subset, (c) calculating a clock skew according to the first time points and the offsets of the time packets included in the subset, (d) calculating a difference between the clock skew and a standard frequency value, (e) determining that an absolute value of the difference is greater than a threshold, and (f) adjusting the operation frequency to an initial frequency after determining that the absolute value of the difference is greater than the threshold.

The frequency calibration apparatus and the frequency calibration method operate in cooperation with the NTP server, so the operation frequency of the oscillator comprised in the frequency calibration apparatus is calibrated timely. Therefore, if an apparatus/equipment (e.g., a small cell) adopts the technology of the present invention, the possibility of operation failure caused by the offset of the operation frequency of the oscillator can be reduced. Moreover, since the cost of the NTP server is relatively low, the economic burden for the users can also be reduced.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a frequency calibration apparatus and a frequency calibration method according to the present invention will be explained with reference to example embodiments thereof. However, these example embodiments are not intended to limit the present invention to any specific examples, embodiments, environment, applications, or implementations described in these example embodiments. Therefore, the description of these example embodiments is only for the purpose of illustration rather than to limit the scope of the present invention.

It shall be appreciated that in the following embodiments and the attached drawings, elements unrelated to the present invention are omitted from depiction. Moreover, dimensional relationships among individual elements in the attached drawings are illustrated only for ease of understanding, but not to limit the actual scale.

Figure 1A:
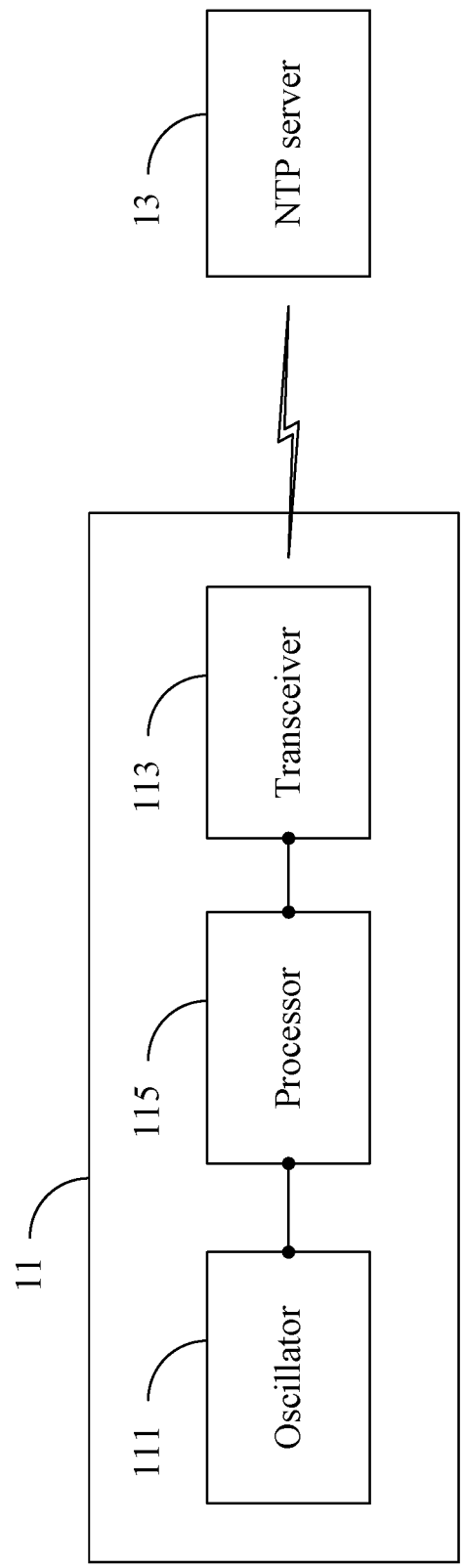
FIG. 1A is a schematic view depicting the architecture of a frequency calibration apparatus 11.

The first embodiment of the present invention is a frequency calibration apparatus 11. A schematic view illustrating the architecture of the frequency calibration apparatus 11 is depicted in FIG. 1A. The frequency calibration apparatus 11 comprises an oscillator 111, a transceiver 113, and a processor 115. The processor 115 is electrically connected to the oscillator 111 and the transceiver 113. The oscillator 111 may be a quartz oscillator, an electronic oscillator, or other types of oscillators known to those of ordinary skill in the art. The transceiver 113 may be any interface capable of communicating with a server. The processor 115 may be of any various processors, central processing units (CPUs), microprocessors, or other computing apparatuses known to those of ordinary skill in the art.

The oscillator 111 operates at an operation frequency (not shown). At the initial stage (e.g., when the frequency calibration apparatus 11 is just started), the operation frequency of the oscillator 111 is at a preset initial frequency (not shown). With the change of the external environment (e.g., the temperature and the humidity) or the aging of hardware, an offset of the operation frequency of the oscillator 111 may occur (i.e., the operation frequency of the oscillator 111 may become different from the initial frequency). In this embodiment, the frequency calibration apparatus 11 operates in cooperation with a Network Time Protocol (NTP) server 13, so the frequency calibration apparatus 11 can perform calibration timely when the offset of the operation frequency of the oscillator 111 occurs. The technique that the frequency calibration apparatus 11 calibrates the offset of the operation frequency will be described in detail later. Since the oscillator of the frequency calibration apparatus 11 has an operation frequency and the operation frequency will be calibrated when an offset thereof is generated, the frequency calibration apparatus 11 may be integrated into other equipment and apparatuses requiring the oscillator (e.g., a small cell) to make the equipment and apparatuses can operate normally in some embodiments of the present invention.

Figure 1B:
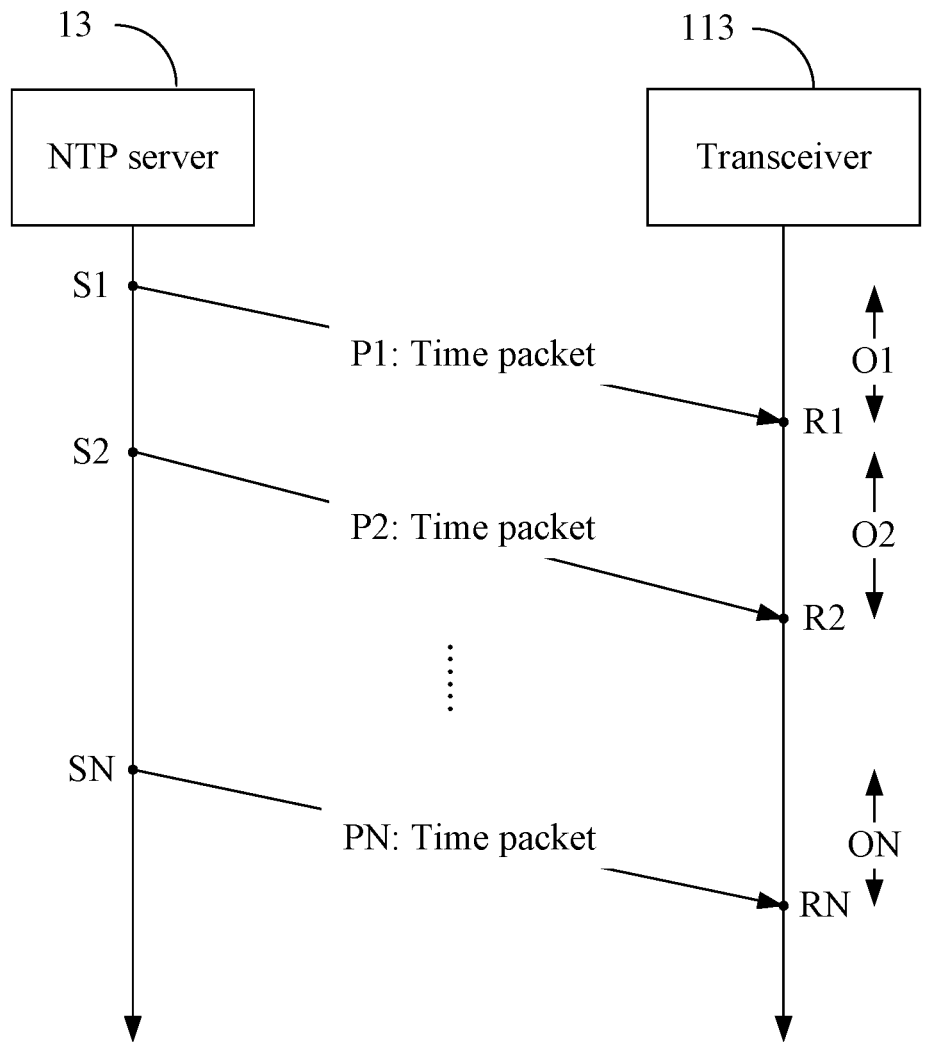
FIG. 1B is a schematic view depicting the signal transmission between a transceiver 113 and a Network Time Protocol (NTP) server 13 of the frequency calibration apparatus 11.

The technique that the frequency calibration apparatus 11 calibrates the operation frequency provided by the oscillator 111 timely will be described now. FIG. 1B is a schematic view depicting the signal transmission between the transceiver 113 of the frequency calibration apparatus 11 and the NTP server 13. The NTP server 13 transmits time packets P1, P2, . . . , PN at the time points S1, S2, . . . , SN respectively, while the transceiver 113 receives the time packets P1, P2, . . . , PN from the NTP server 13 at the time points R1, R2, . . . , RN respectively. Each of the time packets P1, P2, . . . , PN records a time point that the NTP server 13 transmits the time packet. For example, the time packet P1 records the time point S1, the time packet P2 records the time point S2, and the time packet PN records the time point SN.

It shall be appreciated that in some embodiments, the transceiver 113 transmits a plurality of request signals to the NTP server 13, wherein there is a one-to-one correspondence between the request signals and the time packets P1, P2, . . . , PN. In other words, every time the NTP server 13 receives one request signal transmitted from the transceiver 113, the NTP server 13 transmits one corresponding time packet. Moreover, in some embodiments, the transceiver 113 transmits one request signal and the NTP server 13 transmits several time packets after receiving the request signal.

Next, the processor 115 of the frequency calibration apparatus 11 decides a subset of the time packets P1, P2, . . . , PN. In some embodiments, the subset is a part of the time packets P1, P2, . . . , PN. In some embodiments, the subset may include all of the time packets P1, P2, . . . , PN. A concrete example is given herein to elaborate the procedure that the processor 115 decides the subset; however, this concrete example is not intended to limit the scope of the present invention. For example, in some embodiments, each of the time packets P1, P2, . . . , PN corresponds to a Round-Trip Time (RTT). The RTT corresponding to a time packet refers to the time interval beginning from the time point that the transceiver 113 transmits a request signal to the time point that the transceiver 113 receives the time packet. The processor 115 may decide the subset according to the RTTs. For example, in some embodiments, the processor 115 calculates an average time of the RTTs of the time packets P1, P2, . . . , PN and decides the subset according to the average time, e.g., the RTTs of the time packets included in the subset are smaller than the average time. In other embodiments, the average time of the aforesaid RTTs may also be a median value, a mode value, a geometric mean value, a harmonic mean value, or a quartile value of the RTTs.

Next, for each of the time packets included in the subset, the processor 115 of the frequency calibration apparatus 11 subtracts the time point that the transceiver 113 receives the time packet from the time point that the NTP server 13 transmits the time packet to obtain an offset. For better understanding, it is assumed that the subset includes all of the time packets P1, P2, . . . , PN. Under this assumption, the processor 115 subtracts the time point R1 from the time point S1 to obtain an offset O1 for the time packet P1, subtracts the time point R2 from the time point S2 to obtain an offset O2 for the time packet P2, and subtracts the time point RN from the time point SN to obtain an offset ON for the time packet PN.

Next, the processor 115 calculates a clock skew according to the time points that the NTP server 13 transmits the time packets included in the subset and the offsets of the time packets included in the subset. For better understanding, it is assumed that the subset includes all of the time packets P1, P2, . . . , PN. Under this assumption, the processor 115 calculates a clock skew according to the time points S1, S2, . . . , SN and the offsets O1, O2, . . . , ON. In some embodiments, the processor 115 may calculate a clock skew according to the time points that the NTP server 13 transmits the time packets included in the subset and the offsets of the time packets included in the subset through a statistical algorithm. For example, the statistical algorithm may be a linear programming algorithm or a linear regression algorithm.

The technique that the processor 115 calculates a clock skew will be further detailed by taking the linear programming algorithm as an example. For ease of understanding, it is assumed that the subset includes all of the time packets P1, P2, . . . , PN. The processor 115 may regard the time points S1, S2, . . . , SN and the offsets O1, O2, . . . , ON as a plurality of point sets, wherein each of the point sets comprises a time point and the offset corresponding to the time point. For example, the time point S1 and the offset O1 form a point set, the time point S2 and the offset O2 form a point set, and the time point SN and the offset ON form a point set. The basic concept of adopting the linear programming algorithm is to obtain an upper bound of the point sets through the following formula (1).

$$y = \alpha x + \beta \quad (1)$$

In the aforesaid formula (1), the parameter y represents the offset, the parameter x represents the time point, the parameter α represents the to-be-calculated clock skew, and the parameter β represents the intercept. With regards to the parameter β, the initial value of y is β when x equals 0. It is noted that the parameter β does not affect the clock skew (i.e., the parameter α). Therefore, when the clock skew is calculated according to the linear programming algorithm and the point sets, each of the point sets needs to satisfy the limitation of the following formula (2).

$$\alpha \cdot Si + \beta \geq Oi, \forall i \in \{1, 2, \ldots, |n|\} \quad (2)$$

In the aforesaid formula (2), the parameter $S_i$ represents the time instant in the $i^{th}$ point set, the parameter $O_i$ represents the offset in the $i^{th}$ point set, the parameter n represents the number of the point sets, the parameter a represents the to-be-calculated clock skew, and the parameter β represents the intercept. It shall be appreciated that the solution obtained by the processor 115 using the linear programming algorithm will lead to a minimum value of the following formula (3).

$$\frac{1}{|n|} \sum_{i=1}^{|n|} \alpha \cdot Si + \beta - Oi \quad (3)$$

The processor 115 further calculates a difference between the clock skew and a standard frequency value (not shown) after the clock skew is calculated. It shall be appreciated that the standard frequency value may be built in the frequency calibration apparatus 1 or be set in an initialization process (which will be described in detail hereinafter). Next, the processor 115 compares an absolute value of the difference with a first threshold (not shown). If the absolute value of the difference is greater than the first threshold, it means that the offset of the operation frequency of the oscillator 111 is excessive. Thus, the processor 115 adjusts the operation frequency to an initial frequency. If the absolute value of the difference is smaller than the first threshold, it means that the offset of the operation frequency of the oscillator 111 is still acceptable. Hence, the processor 115 makes no adjustment to the operation frequency. It is assumed that the standard frequency value is 12.150 parts per million (which is called "ppm" for short hereinafter) and the first threshold is 200 parts per billion (which is called "ppb" for short hereinafter). Under such an assumption, if the clock skew is 12.134 ppm, the processor 115 makes no adjustment to the operation frequency of the oscillator 111 because the absolute value (i.e., 16 ppb) of the difference between the clock skew and the first threshold is smaller than the first threshold. If the clock skew is 12.354 ppm, the processor 115 adjusts the operation frequency of the oscillator 111 to an initial frequency because the absolute value (i.e., 204 ppb) of the difference between the clock skew and the first threshold is greater than the first threshold.

As described above, in some embodiments, the standard frequency value used by the frequency calibration apparatus 11 may be set in an initialization process. Two specific examples regarding the calculation of the standard frequency value in an initialization process are given herein, which, however, are not intended to limit the scope of the present invention.

Figure 1C:
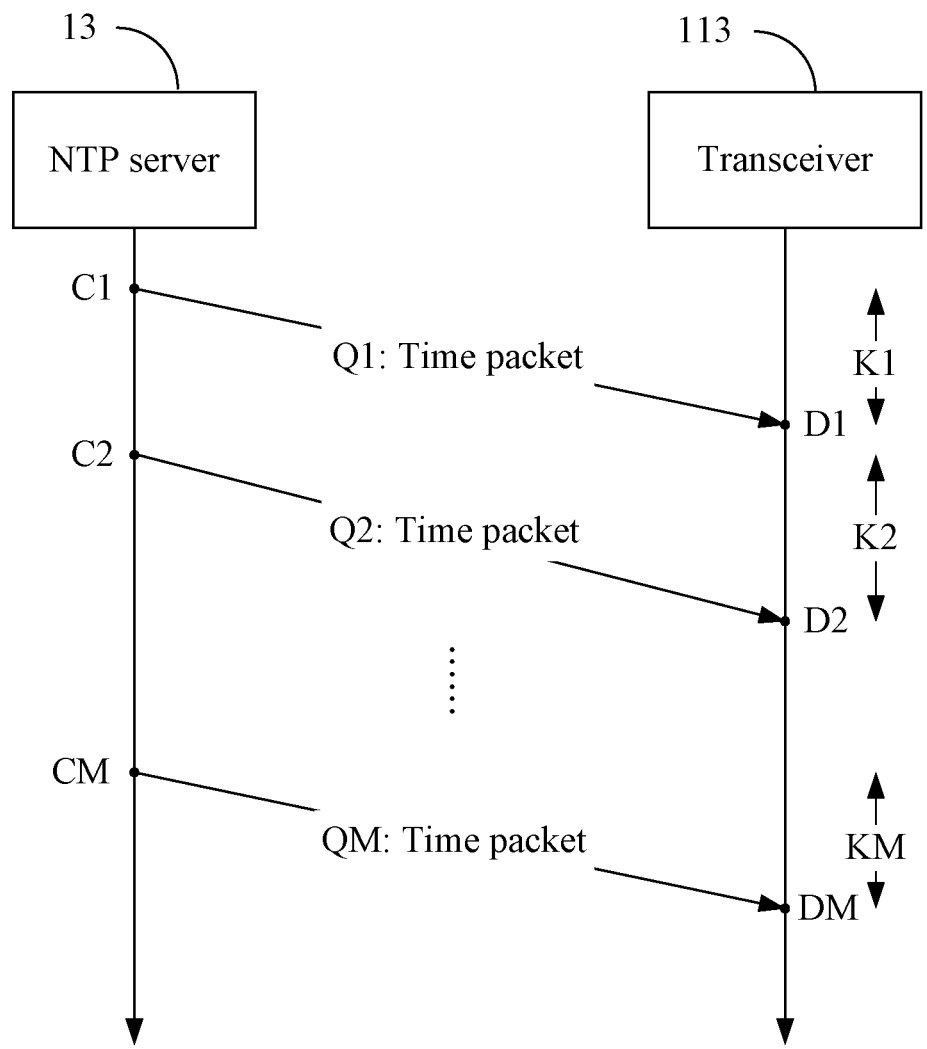
FIG. 1C is a schematic view depicting the transmission of reference time packets.

Please refer to FIG. 1C for the first specific example. The NTP server 13 transmits the reference time packets Q1, Q2, . . . , QM at the reference time points C1, C2, . . . , CM respectively, while the transceiver 113 receives the reference time packets Q1, Q2, . . . , QM from the NTP server 13 at reference time points D1, D2, . . . , DM respectively. It shall be appreciated that the reference time points C1, C2, . . . , CM and D1, D2, . . . , DM are earlier than the time points S1, S2, . . . , SN and R1, R2, . . . , RN. Each of the reference time packets Q1, Q2, . . . , QM records the time point that the NTP server 13 transmits the reference time packet. For example, the reference time packet Q1 records the reference time point C1, the reference time packet Q2 records the reference time point C2, and the reference time packet QM records the reference time point CM. For each of the reference time packets Q1, Q2, . . . , QM, the processor 115 subtracts the reference time point that the transceiver 113 receives the reference time packet from the reference time point that the NTP server 13 transmits the reference time packet to obtain a reference offset. For example, for reference time packet Q1, the processor 115 subtracts the reference time point D1 from the reference time point C1 to obtain a reference offset K1; for reference time packet Q2, the processor 115 subtracts the reference time point D2 from the reference time point C2 to obtain a reference offset K2; and for reference time packet QM, the processor 115 subtracts the reference time point DM from the reference time point CM to obtain a reference offset KM. Next, the processor 115 calculates the standard frequency value according to the reference time points C1, C2, . . . , CM and the reference offsets K1, K2, . . . , KM. Specifically, the way in which the processor 115 calculates the standard frequency value is the same as the way in which the clock skew is calculated. Based on the descriptions regarding the calculation of the clock skew in this specification, a person having ordinary skill in the art will understand the details regarding the calculation of the standard frequency value according to the reference time points C1, C2, . . . , CM and the reference offsets K1, K2, . . . , KM. Therefore, the details will not be further described herein.

As an extension of the first specific example, the second specific example will be described. Specifically, the frequency calibration apparatus 11 repeatedly calculates the standard frequency value in the way described in the first specific example, repeatedly calculates a difference between two successive standard frequency values, and then determines whether two successive differences are smaller than a second threshold (not shown). If two successive differences are all smaller than the second threshold, the processor 115 of the frequency calibration apparatus 11 determines the final standard frequency value according to the corresponding standard frequency values.

For ease of understanding, it is assumed that the frequency calibration apparatus 11 sequentially calculates three standard frequency values in the way described in the first specific example. For ease of subsequent description, the three standard frequency values are individually called a first reference standard frequency value, a second reference standard frequency value, and a third reference standard frequency value. The first reference standard frequency value precedes the second reference standard frequency value, while the second reference standard frequency value precedes the third reference standard frequency value. The processor 115 calculates the first difference between the first reference standard frequency value and the second reference standard frequency value and then calculates the second difference between the second reference standard frequency value and the third reference standard frequency value. If the processor 115 determines that both the first difference and the second difference are smaller than the second threshold, the processor 115 further decides the standard frequency value according to the first reference standard frequency value, the second reference standard frequency value, and the third reference standard frequency value. For example, the processor 115 may take the median of the first reference standard frequency value, the second reference standard frequency value, and the third reference standard frequency value as the standard frequency value. As another example, the processor 115 may take the average of the first reference standard frequency value, the second reference standard frequency value, and the third reference standard frequency value as the standard frequency value.

According to the above descriptions, the frequency calibration apparatus 11 operates in cooperation with the NTP server 13, so the operation frequency of the oscillator 111 comprised in the frequency calibration apparatus 11 can be calibrated timely. Therefore, when an equipment or apparatus (e.g., a small cell) operates together with the frequency calibration apparatus 11 or has the frequency calibration apparatus 11 built therein, the possibility of operation failure caused by the offset of the operation frequency of the oscillator 111 can be reduced. Moreover, since the cost of the NTP server 13 is relatively low, the economic burden for the users can also be reduced.

Figure 2:
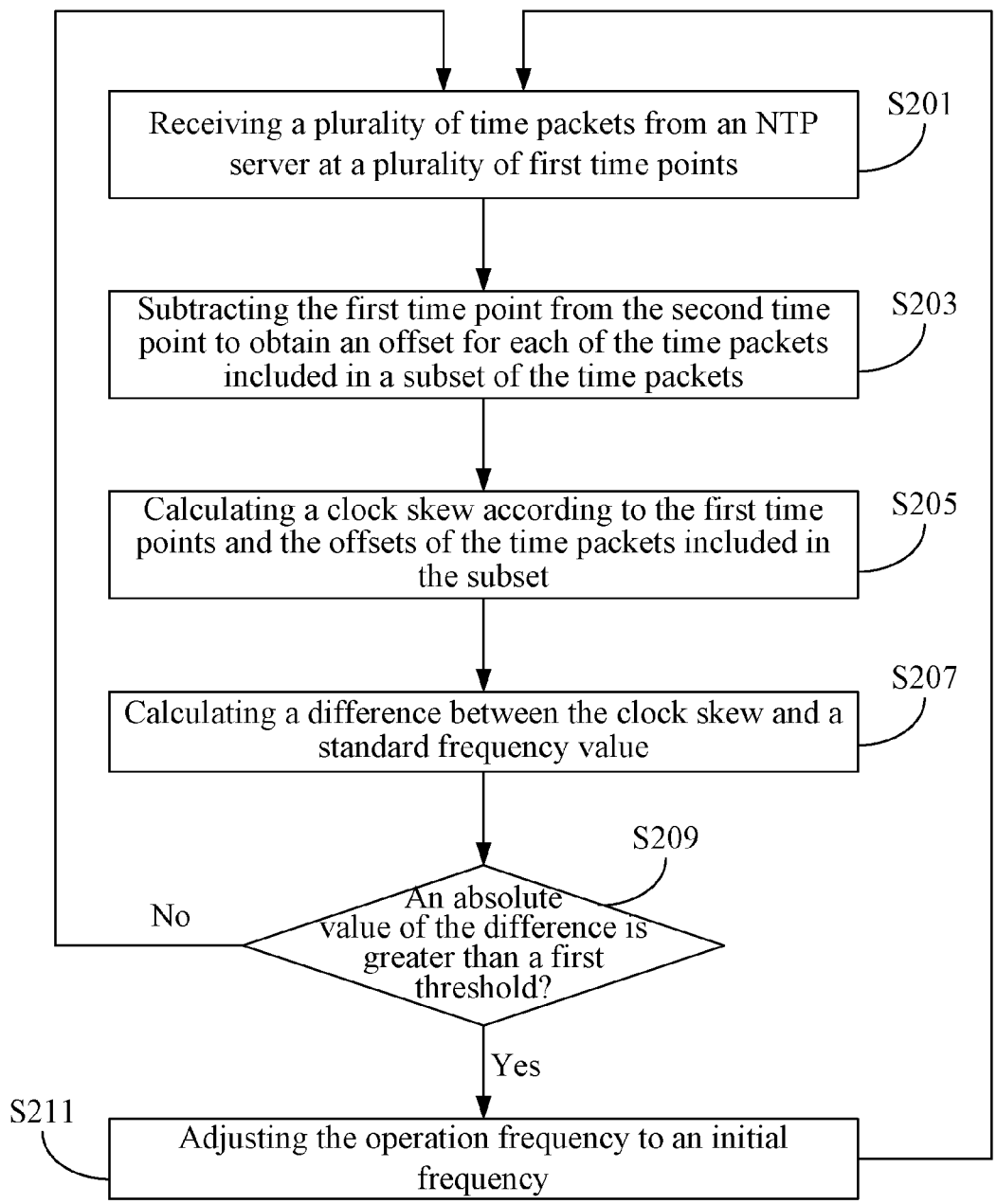
FIG. 2 is a flowchart diagram depicting a frequency calibration method.

The second embodiment of the present invention is a frequency calibration method and a flowchart diagram of which is depicted in FIG. 2. The frequency calibration method is for use in an electronic apparatus (e.g., the frequency calibration apparatus 11 of the first embodiment). The electronic apparatus comprises an oscillator, wherein the oscillator has an operation frequency. In the initial operation, the operation frequency of the oscillator is an initial frequency.

First, step S201 is executed by the electronic apparatus to receive a plurality of time packets from an NTP server at a plurality of first time points. It shall be appreciated that each of the time packets records a second time point that the NTP server transmits the time packet. Next, step S203 is executed by the electronic apparatus to subtract the first time point from the second time point to obtain an offset for each of the time packets included in a subset of the time packets (i.e., all or part of the time packets).

It shall be appreciated that in some embodiments, each of the time packets corresponds to an RTT. In those embodiments, another step may be further executed in the frequency calibration method to decide the subset according to the RTTs. For example, a step may be executed in the frequency calibration method to calculate an average time of the RTTs. The RTTs of the time packets included in the subset are smaller than the average time. In other embodiments, the average time of the aforesaid RTTs may also be a median value, a mode value, a geometric mean value, a harmonic mean value, or a quartile value of the RTTs.

Thereafter, in step S205, a clock skew is calculated by the electronic apparatus according to the first time points and the offsets of the time packets included in the subset. It shall be appreciated that in some embodiments, step S205 may be executed to calculate the clock skew according to the first time points, the offsets, and a statistical algorithm. For example, the statistical algorithm may be a linear programming algorithm or a linear regression algorithm.

Next, in step S207, a difference between the clock skew and standard frequency value is calculated by the electronic apparatus. Thereafter, in step S209, it is determined by the electronic apparatus whether the absolute value of the difference is greater than a first threshold. If the determination result of the step S209 is that the absolute value of the difference is greater than the first threshold, step S211 is executed to adjust the operation frequency to an initial frequency by the electronic apparatus. Thereafter, step S201 is executed again to perform assessment in the following stage. If the determination result of the step S209 is that the absolute value of the difference is not greater than the first threshold, the operation frequency of the oscillator does not need to be adjusted. Therefore, step S201 is directly executed to perform assessment in the following stage.

Figure 3:
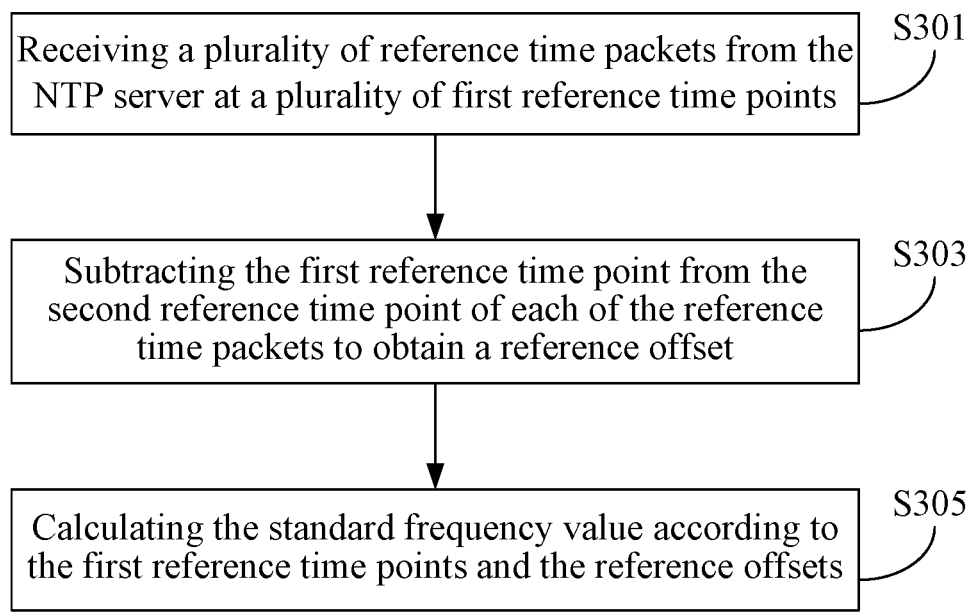
FIG. 3 is a flowchart diagram depicting an initialization process of a frequency calibration method.

It shall be appreciated that the initialization process as shown in FIG. 3 may be executed before step S201 in some embodiments. Specifically, in step S301, a plurality of reference time packets are received by the electronic apparatus from the NTP server at a plurality of first reference time points. It shall be appreciated that each of the reference time packets records a second reference time point that the NTP server transmits the reference time packet. Next, in step S303, the first reference time point is subtracted from the second reference time point of each of the reference time packets by the electronic apparatus to obtain a reference offset. Since there are a plurality of reference time packets, a plurality of reference offsets will be obtained.

In step S305, the standard frequency value is calculated by the electronic apparatus according to the first reference time points and the reference offsets. Specifically, the way in which the standard frequency value is calculated in step S305 is the same as the way in which the standard frequency value is calculated in step S205. The method in which the standard frequency value is calculated in the step S305 shall be appreciated by those of ordinary skill in the art according to the description of the aforesaid step S205 and, thus, will not be further described herein.

It shall be appreciated that in some embodiments, steps S301 to S305 may be executed repeatedly in the frequency calibration method to calculate several standard frequency values, to repeatedly calculate a difference between two successive standard frequency values, and to determine whether two successive differences are smaller than a second threshold. If two successive differences are all smaller than the second threshold, the final standard frequency value is decided according to the corresponding standard frequency values in the frequency calibration method.

For ease of understanding, it is assumed that steps S301 to S305 are executed repeatedly in the frequency calibration method to sequentially obtain three standard frequency values. For ease of subsequent description, the three standard frequency values are respectively called the first reference standard frequency value, second reference standard frequency value, and third reference standard frequency value. A step is further executed in the frequency calibration method to calculate a first difference between the first reference standard frequency value and the second reference standard frequency value. Another step is executed to calculate a second difference between the second reference standard frequency value and the third reference standard frequency value. If it is determined that both the first difference and the second difference are smaller than the second threshold, the standard frequency value is further decided according to the first reference standard frequency value, the second reference standard frequency value and the third reference standard frequency value.

In addition to the aforesaid steps, the frequency calibration method of the second embodiment can also execute all the operations and steps of the frequency calibration apparatus 11 set forth in the first embodiment, have the same functions, and achieve the same technical effects as the first embodiment. The technique in which the second embodiment executes these operations and steps, has the same functions, and achieves the same technical effects as the first embodiment will be readily appreciated by those of ordinary skill in the art based on the explanation of the first embodiment. Hence, the details will not be further described herein.

It shall be appreciated that in the patent specification of the present invention, the terms "first" and "second" used in "the first threshold" and "the second threshold" are only intended to distinguish these thresholds from each other. The terms "first" and "second" used in "the first difference" and "the second difference" are only intended to distinguish these differences from each other. The terms "first," "second," and "third" used in "the first reference standard frequency value," "the second reference standard frequency value," and "the third reference standard frequency value" are only intended to distinguish these reference standard frequency values from each other. The terms "first" and "second" used in "the first time point" and "the second time point" are only intended to distinguish these time points from each other. The terms "first" and "second" used in "the first reference time point" and "the second reference time point" are only intended to distinguish these reference time points from each other.

According to the above descriptions, the frequency calibration apparatus and the frequency calibration method according to the present invention operate in cooperation with the NTP server, so the operation frequency of the oscillator comprised in the frequency calibration apparatus is calibrated timely. Therefore, if an equipment or apparatus (e.g., a small cell) adopts the technology of the present invention, the possibility of operation failure caused by the offset of the operation frequency of the oscillator can be reduced. Moreover, since the cost of the NTP server is relatively low, the economic burden for the users can also be reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A frequency calibration apparatus, comprising:
an oscillator, having an operation frequency;
a transceiver, being configured to receive a plurality of time packets from a Network Time Protocol (NTP) server at a plurality of first time points, each of the time packets recording a second time point that the NTP server transmits the time packet; and
a processor, being electrically connected to the oscillator and the transceiver and configured to execute the following operation for a subset of the time packets:
subtracting the first time point from the second time point to obtain an offset for each of the time packets included in the subset;
wherein the processor further calculates a clock skew according to the first time points and the offsets of the time packets included in the subset, calculates a difference between the clock skew and a standard frequency value, determines that an absolute value of the difference is greater than a first threshold, and adjusts the operation frequency to an initial frequency after determining that the absolute value of the difference is greater than the first threshold.

2. The frequency calibration apparatus as claimed in claim 1, wherein the transceiver further receives a plurality of reference time packets from the NTP server at a plurality of first reference time points, each of the reference time packets records a second reference time point that the NTP server transmits the reference time packet, the processor further subtracts the first reference time point from the second reference time point to obtain a reference offset for each of the reference time packets, and the processor further calculates the standard frequency value according to the first reference time points and the reference offsets.

3. The frequency calibration apparatus as claimed in claim 1, wherein the transceiver further receives a plurality of first reference time packets from the NTP server at a plurality of first reference time points, each of the first reference time packets records a second reference time point that the NTP server transmits the first reference time packet, the processor further subtracts the first reference time point from the second reference time point to obtain a first reference offset for each of the first reference time packets, the processor further calculates a first reference standard frequency value according to the first reference time points and the first reference offsets, the transceiver further receives a plurality of second reference time packets from the NTP server at a plurality of third reference time points, each of the second reference time packets records a fourth reference time point that the NTP server transmits the second reference time packet, the processor further subtracts the third reference time point from the fourth reference time point to obtain a second reference offset for each of the second reference time packets, the processor further calculates a second reference standard frequency value according to the second reference time points and the second reference offsets, the transceiver further receives a plurality of third reference time packets from the NTP server at a plurality of fifth reference time points, each of the third reference time packets records a sixth reference time point that the NTP server transmits the third reference time packet, the processor further subtracts the fifth reference time point from the sixth reference time point to obtain a third reference offset for each of the third reference time packets, the processor further calculates a third reference standard frequency value according to the fifth reference time points and the third reference offsets, the processor further calculates a first difference between the first reference standard frequency value and the second reference standard frequency value and a second difference between the second reference standard frequency value and the third reference standard frequency value, the processor determines that both the first difference and the second difference are smaller than a second threshold, and the processor further decides the standard frequency value according to the first reference standard frequency value, the second reference standard frequency value, and the third reference standard frequency value.

4. The frequency calibration apparatus as claimed in claim 1, wherein the processor calculates the clock skew according to the first time points, the offsets, and a statistical algorithm.

5. The frequency calibration apparatus as claimed in claim 1, wherein each of the time packets corresponds to a Round-Trip Time (RTT) and the processor decides the subset according to the RTTs.

6. The frequency calibration apparatus as claimed in claim 1, wherein each of the time packets corresponds to an RTT, the processor calculates an average time of the RTTs, and the RTTs of the time packets included in the subset are smaller than the average time.

7. A frequency calibration method for an electronic apparatus, the electronic apparatus comprising an oscillator having an operation frequency, and the frequency calibration method comprising:
 (a) receiving a plurality of time packets from a Network Time Protocol (NTP) server at a plurality of first time points, each of the time packets recording a second time point that the NTP server transmits the time packet;
 (b) executing the following operation for a subset of the time packets:
  subtracting the first time point from the second time point to obtain an offset for each of the time packets included in the subset;
 (c) calculating a clock skew according to the first time points and the offsets of the time packets included in the subset;
 (d) calculating a difference between the clock skew and a standard frequency value;
 (e) determining that an absolute value of the difference is greater than a first threshold; and
 (f) adjusting the operation frequency of the electronic apparatus to an initial frequency after determining that the absolute value of the difference is greater than the first threshold.

8. The frequency calibration method as claimed in claim 7, further comprising:
 receiving a plurality of reference time packets from the NTP server at a plurality of first reference time points, each of the reference time packets recording a second reference time point that the NTP server transmits the reference time packet;
 subtracting the first reference time point from the second reference time point to obtain a reference offset for each of the reference time packets; and
 calculating the standard frequency value according to the first reference time points and the reference offsets.

9. The frequency calibration method as claimed in claim 7, further comprising:
 receiving a plurality of first reference time packets from the NTP server at a plurality of first reference time points, each of the first reference time packets recording a second reference time point that the NTP server transmits the first reference time packet;
 subtracting the first reference time point from the second reference time point to obtain a first reference offset for each of the first reference time packets;
 calculating a first reference standard frequency value according to the first reference time points and the first reference offsets;
 receiving a plurality of second reference time packets from the NTP server at a plurality of third reference time points, each of the second reference time packets recording a fourth reference time point that the NTP server transmits the second reference time packet;
 subtracting the third reference time point from the fourth reference time point to obtain a second reference offset for each of the second reference time packets;
 calculating a second reference standard frequency value according to the second reference time points and the second reference offsets;
 receiving a plurality of third reference time packets from the NTP server at a plurality of fifth reference time points, each of the third reference time packets recording a sixth reference time point that the NTP server transmits the third reference time packet;
 subtracting the fifth reference time point from the sixth reference time point to obtain a third reference offset for each of the third reference time packets;
 calculating a third reference standard frequency value according to the fifth reference time points and the third reference offsets;
 calculating a first difference between the first reference standard frequency value and the second reference standard frequency value;
 calculating a second difference between the second reference standard frequency value and the third reference standard frequency value;
 determining that both the first difference and the second difference are smaller than a second threshold; and
 deciding the standard frequency value according to the first reference standard frequency value, the second reference standard frequency value, and the third reference standard frequency value.

10. The frequency calibration method as claimed in claim 7, wherein the step calculates the clock skew according to the first time points, the offsets, and a statistical algorithm.

11. The frequency calibration method as claimed in claim 7, wherein each of the time packets corresponds to a Round-Trip Time (RTT) and the frequency calibration method further comprises:
 deciding the subset according to the RTTs.

12. The frequency calibration method as claimed in claim 7, wherein each of the time packets corresponds to a Round-Trip Time (RTT) and the frequency calibration method further comprises:
 calculating an average time of the RTTs,
 wherein the RTTs of the time packets included in the subset are smaller than the average time.

* * * * *